(12) United States Patent
Iida

(10) Patent No.: US 11,400,640 B2
(45) Date of Patent: Aug. 2, 2022

(54) MANUFACTURING METHOD FOR TANK

(71) Applicant: TOYOTA JIDOSHA KABUSHIKI KAISHA, Toyota (JP)

(72) Inventor: Yasuhiro Iida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 612 days.

(21) Appl. No.: 16/424,609

(22) Filed: May 29, 2019

(65) Prior Publication Data

US 2020/0070401 A1 Mar. 5, 2020

(30) Foreign Application Priority Data

Aug. 31, 2018 (JP) .............................. JP2018-162431

(51) Int. Cl.
*B29C 63/24* (2006.01)
*F17C 1/06* (2006.01)
*B29L 31/00* (2006.01)
*B29K 63/00* (2006.01)

(52) U.S. Cl.
CPC ................ *B29C 63/24* (2013.01); *F17C 1/06* (2013.01); *B29K 2063/00* (2013.01); *B29L 2031/7172* (2013.01); *F17C 2201/0109* (2013.01); *F17C 2203/012* (2013.01); *F17C 2203/0604* (2013.01); *F17C 2203/0621* (2013.01); *F17C 2209/2154* (2013.01); *F17C 2221/012* (2013.01); *F17C 2270/0184* (2013.01)

(58) Field of Classification Search
CPC combination set(s) only.
See application file for complete search history.

(56) References Cited

U.S. PATENT DOCUMENTS

| 2012/0024746 A1 | 2/2012 | Otsubo |
| 2013/0087567 A1* | 4/2013 | Kaneko ..................... F17C 1/06 220/590 |

FOREIGN PATENT DOCUMENTS

| JP | 2011-005660 A | 1/2011 |
| JP | 2011179638 A | 9/2011 |
| JP | 2014-133304 A | 7/2014 |
| WO | 2010/116526 A1 | 10/2010 |

* cited by examiner

*Primary Examiner* — Vishal I Patel
(74) *Attorney, Agent, or Firm* — Dickinson Wright, PLLC

(57) ABSTRACT

A manufacturing method for a tank is a method of manufacturing the tank by winding fibers impregnated with an epoxy resin in a plurality of layers around an outer circumference of a liner having a body part and dome parts provided at both ends of the body part. The manufacturing method includes sequentially laminating a plurality of hoop layers by hoop-winding the fibers from a side closer to an outer circumference of the body part toward a side farther from the outer circumference of the body part. When laminating the hoop layers, a temperature of end portions of the body part adjacent to the dome parts is set lower than a temperature of a remaining portion of the body part, the remaining portion being a portion of the body part other than the end portions.

6 Claims, 5 Drawing Sheets

MANUFACTURING METHOD FOR TANK

INCORPORATION BY REFERENCE

The disclosure of Japanese Patent Application No. 2018-162431 filed on Aug. 31, 2018 including the specification, drawings and abstract is incorporated herein by reference in its entirety.

BACKGROUND

1. Technical Field

The present disclosure relates to a manufacturing method for a tank that manufactures a tank by winding fibers impregnated with a resin in a plurality of layers around an outer circumference of a liner.

2. Description of Related Art

Tanks such as hydrogen tanks installed in fuel cell vehicles are required to have a high pressure capacity, etc. in order to ensure safety. As a method of manufacturing such tanks, a filament winding (FW) method is known. Specifically, while a liner having a body part and dome parts provided at both ends of the body part is rotated, fibers impregnated with an uncured thermosetting resin are repeatedly wound around the outer circumference of the liner at a constant tension (i.e. force to wind the fibers) to form a reinforcing layer composed of hoop layers and helical layers, and thereafter the thermosetting resin is thermoset.

As an example, WO 2010/116526 A discloses a method of manufacturing a tank capable of improving efficiency of strength development by using wound fibers through optimization of the lamination form of the hoop layers and the helical layers, and the hoop layers formed by hoop-winding the fibers are sequentially laminated from a side closer to the outer circumference of the body part of the liner toward a side farther from the outer circumference of the body part.

SUMMARY

However, when the plurality of hoop layers are sequentially laminated on the outer circumference of the body part from the side closer to the outer circumference of the body part toward the side farther from the outer circumference of the body part, because force of winding the fibers of the outer hoop layers (i.e. the hoop layers farther from the outer circumference of the liner) adds pressure to the fibers of the inner hoop layers (i.e. the hoop layers closer to the outer circumference of the liner), the fibers of the inner hoop layers are pushed outward in the axial direction of the central axis of the liner. As a result, the fibers of the inner hoop layers may skid and the disposition thereof may be deviated. Particularly, at the end portions of the body part adjacent to the dome parts, such positional displacement of the fibers tends to occur. When positional displacement of the fiber occurs, initial strength and fatigue strength of the tank are deteriorated.

The present disclosure is a manufacturing method for a tank, the manufacturing method being capable of reducing positional displacement of fibers at end portions of a body part adjacent to dome parts during hoop winding.

A manufacturing method for a tank according to an aspect of the present disclosure is a manufacturing method for a tank, manufacturing the tank by winding fibers impregnated with a resin in a plurality of layers around an outer circumference of a liner having a body part and dome parts provided at both ends of the body part, and the manufacturing method includes: sequentially laminating a plurality of hoop layers by hoop-winding the fibers from a side closer to an outer circumference of the body part toward a side farther from the outer circumference of the body part, wherein when laminating the hoop layers, a temperature of end portions of the body part adjacent to the dome parts is set lower than a temperature of a remaining portion of the body part, the remaining portion being a portion of the body part other than the end portions.

In the manufacturing method for the tank according to the aspect of the present disclosure, when laminating the hoop layers, by setting the temperature of the end portions of the body part adjacent to the dome parts lower than the temperature of the remaining portion of the body part, it is possible to increase viscosity of the resin with which the fibers wound around the end portions are impregnated; thus, the tackiness of the resin can be increased. Accordingly, it possible to reduce the positional displacement of the fibers at the end portions of the body part adjacent to the dome parts.

In the manufacturing method for the tank according to an aspect of the present disclosure, the resin may be an epoxy resin. With this configuration, by utilizing excellent adhesiveness of the epoxy resin, it is possible to enhance the effect of reducing the positional displacement of the fibers at the end portions of the body part adjacent to the dome parts.

In the manufacturing method for the tank according to an aspect of the present disclosure, when laminating the hoop layers, the temperature of the end portions of the body part adjacent to the dome parts may be set at 16° C. or less. With this configuration, amount of the positional displacement of the fibers at the end portions of the body part adjacent to the dome parts can be reduced to 2 mm or less.

In the manufacturing method for the tank according to an aspect of the present disclosure, when laminating the hoop layers, the temperature of the end portions of the body part adjacent to the dome parts may be set at 16° C. or less and 5° C. or more.

In the manufacturing method for the tank according to an aspect of the present disclosure, when laminating the hoop layers, the temperature of the remaining portion of the body part may be set at 20° C. or more and 25° C. or less.

In the manufacturing method for the tank according to an aspect of the present disclosure, when laminating the hoop layers, the fibers may be hoop-wound from a first end portion of the end portions of the body part to a second end portion of the end portions of the body part such that an Nth, N is an integer of 1 or more, hoop layer is formed, and the fibers may be turned back at the second end portion and hoop-wound such that an (N+1)th hoop layer is formed on an outer side of the Nth hoop layer.

According to the above aspects, it is possible to reduce the positional displacement of the fibers at the end portions of the body part adjacent to the dome parts during the hoop winding.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of a manufacturing method for a tank will be explained with reference to the drawings, and prior to the explanation, the structure of a tank 1 will be described based on FIG. 1.

Figure 1:
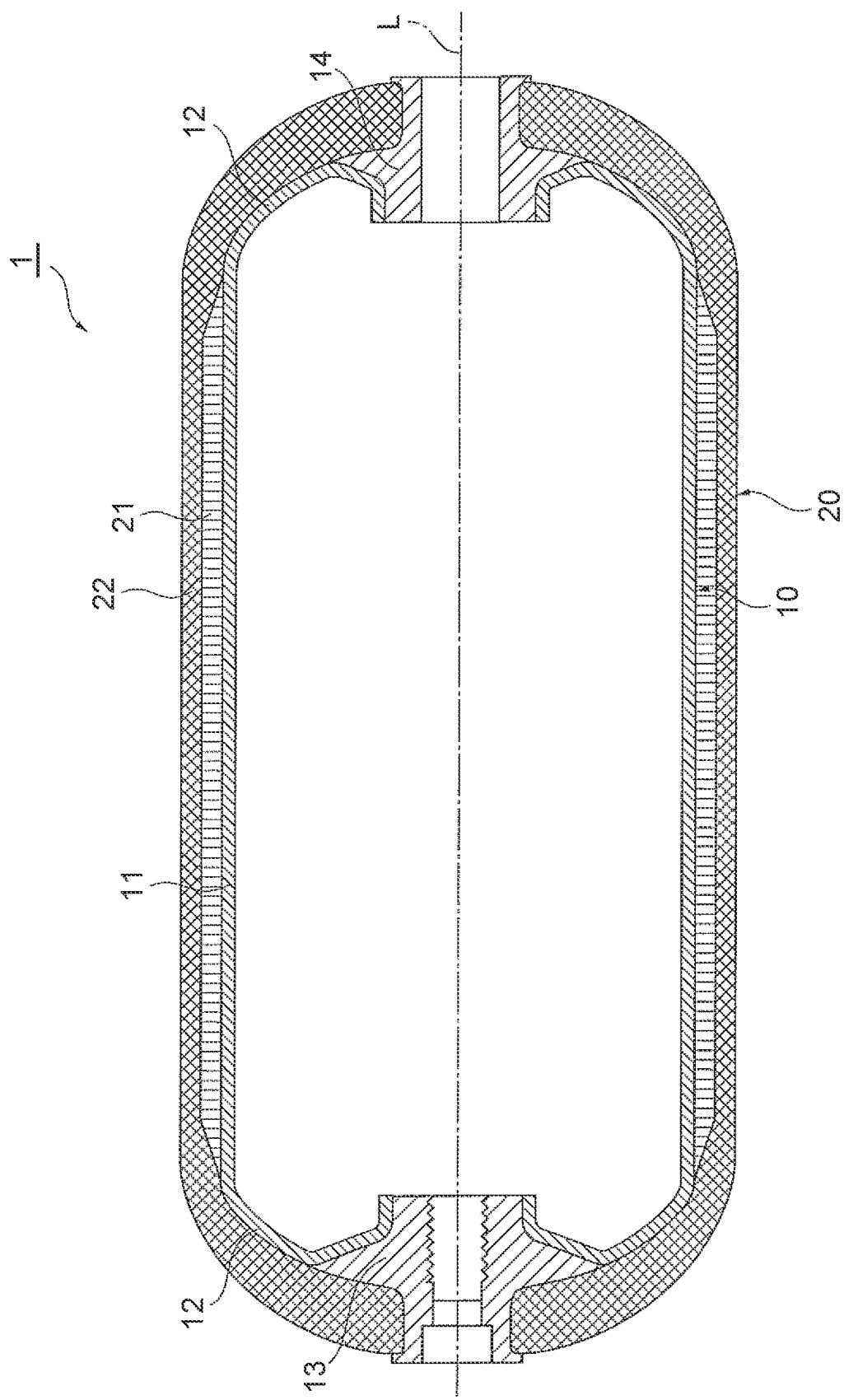
FIG. 1 is a sectional view showing a structure of a tank.

FIG. 1 is a sectional view showing the structure of the tank 1. The tank 1 is a high-pressure tank installed in, for example, a fuel cell vehicle, and can store high-pressure hydrogen thereinside. The tank 1 is provided with a liner 10 having a fluid storage space and an FRP layer (fiber reinforced plastic layer) 20 in close contact with an outer circumference of the liner 10.

The liner 10 has a gas barrier property against hydrogen gas. The liner 10 is a hollow container including a substantially cylindrical body part 11, and substantially hemispherical dome parts 12 respectively provided at both left and right ends of the body part 11. Openings are formed at respective tops of the two dome parts 12, and a valve-side port ring 13 is inserted in one of these openings, and an end-side port ring 14 is inserted in the other of these opening.

The liner 10 is integrally formed by a rotation-blow molding method using, for example, a resin member, such as polyethylene and nylon. Further, the liner 10 may be formed of a light metal, such as aluminum, instead of the resin member. In addition, the liner 10 may be formed by joining a plurality of separate members formed by injection-extrusion molding or the like, instead of an integral-formation manufacturing method, such as a rotation-blow molding method.

The FRP layer 20 includes a plurality of hoop layers 21 laminated so as to cover the outer circumference of the body part 11 of the liner 10, and a plurality of helical layers 22 that totally covers the liner 10 in such a manner as to enclose the hoop layers 21 and the dome parts 12.

Figure 6A:
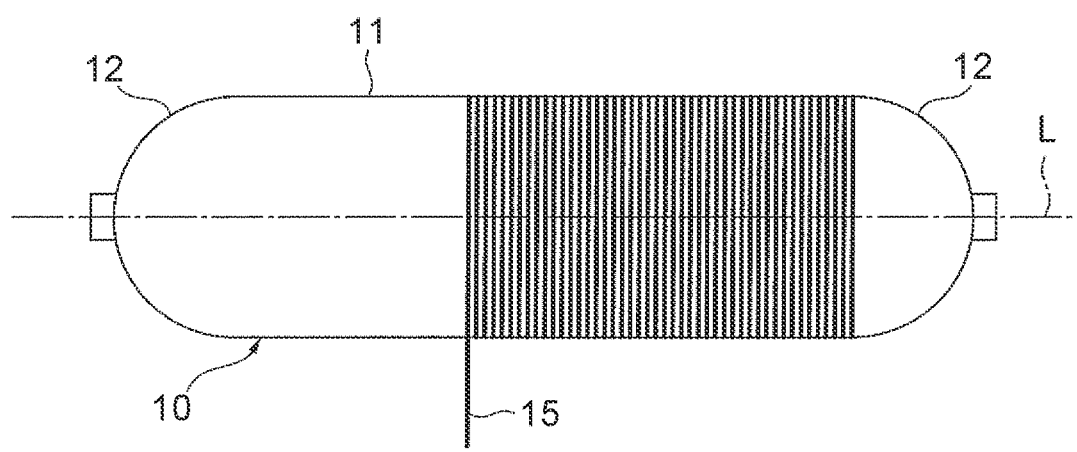
FIG. 6A is a schematic view explaining formation of hoop layers by hoop winding.

As shown in FIG. 6A, the hoop layers 21 are fiber layers formed by hoop-winding fibers 15 impregnated with an epoxy resin in the circumferential direction of the body part 11 at a winding angle substantially perpendicular to the central axis L of the liner 10. Here, an expression, "substantially vertical" includes both an angle of 90° and an angle of appropriately 90° that can be generated when winding positions of the fibers 15 are shifted such that the fibers 15 do not overlap with each other.

Figure 6B:
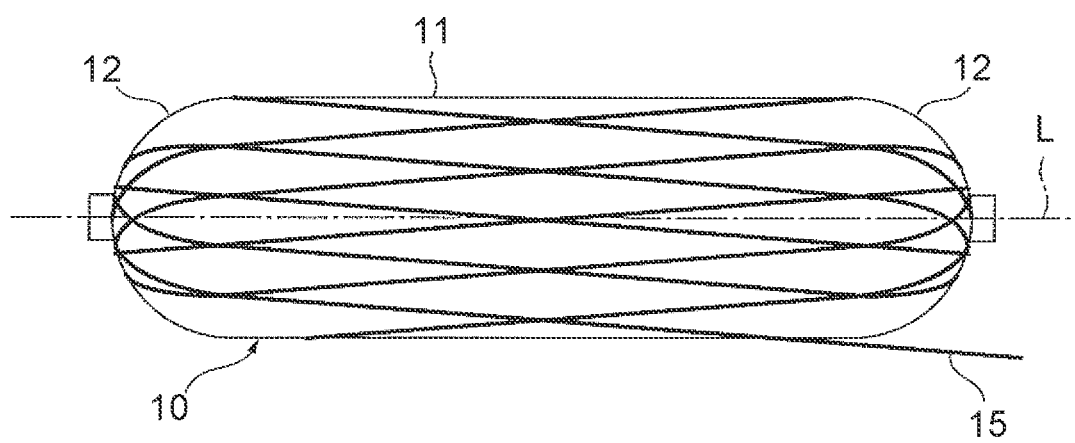
FIG. 6B is a schematic view explaining formation of helical layers by helical winding.

On the other hand, as shown in FIG. 6B, the helical layers 22 are formed by helically winding the fibers 15 in the circumferential direction of the body part 11 and the dome parts 12 at a winding angle of 00 or more and less than 90° relative to the central axis L of the liner 10. The helical winding can be classified into a low-angle helical winding and a high-angle helical winding depending on the winding angle. The low-angle helical winding is a helical winding when the winding angle is small (for example, more than 0° and less than 30°), and is a method in which a turnback of the winding direction of the fibers 15 in the dome part 12 occurs before the fibers 15 are wound around the central axis L by one round. The high-angle helical winding is a helical winding when the winding angle is great (e.g. greater than 30° and smaller than 90°), and is a winding method in which the fibers 15 are wound around the central axis L by at least one round in the body part 11 until a turnback of the fibers 15 in the winding direction occurs in the dome part 12. Note that FIG. 6B shows the low-angle helical winding.

The manufacturing method for the tank 1 having the above-described structure mainly includes: a hoop layer lamination step of sequentially laminating a plurality of hoop layers 21 on the outer circumference of the body part 11; a helical layer lamination step of laminating a plurality of helical layers 22 totally covering the liner 10; and a thermosetting step of thermosetting the hoop layers 21 and the helical layers 22 both of which are laminated.

Figure 2:
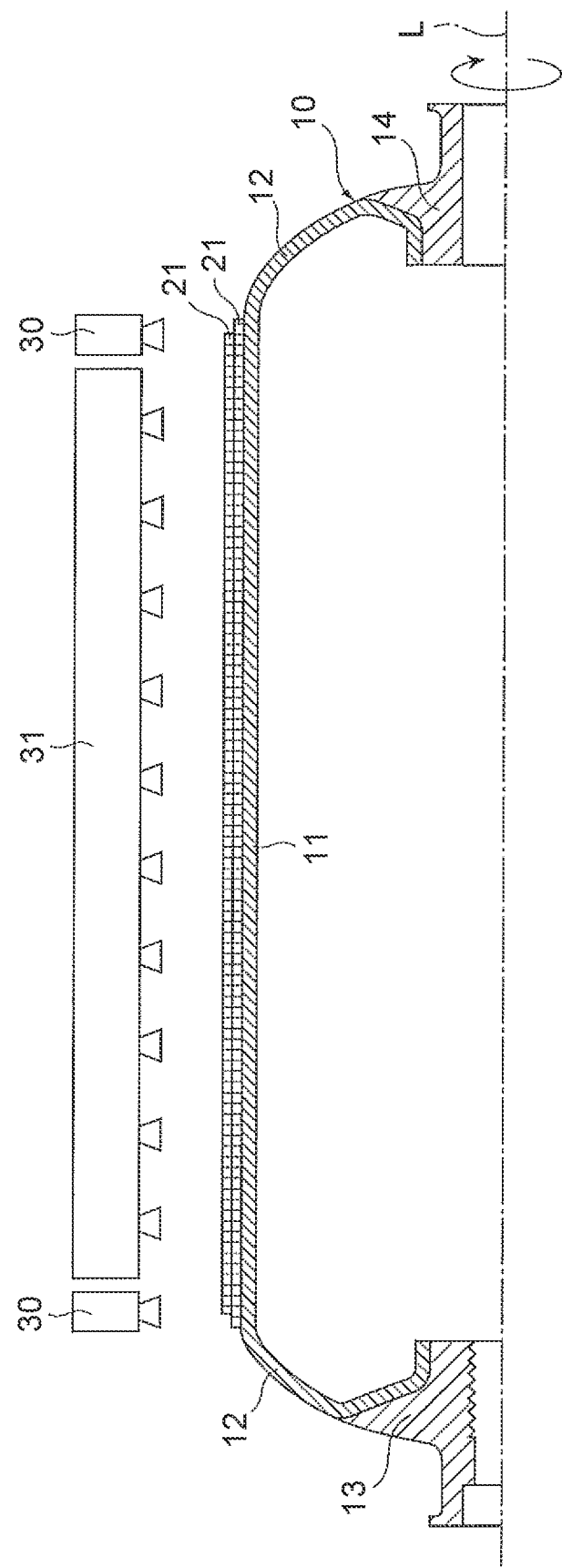
FIG. 2 is a schematic view explaining a manufacturing method for the tank according to an embodiment.

In the hoop layer lamination step, as shown in FIG. 2, the fibers 15 impregnated with the epoxy resin are hoop-wounded from a side closer to the outer circumference of the body part 11 of the liner 10 toward a side farther from the outer circumference of the body part 11 so as to sequentially laminate the plurality of hoop layers 21. Specifically, in a state in which the liner 10 is attached to a rotation driving unit (not shown), the liner 10 is rotated about the central axis L of the liner 10, and the fibers 15 are fed toward the liner 10 side while a reel (not shown) around which the fibers 15 impregnated with the epoxy resin are wound is reciprocated along the central axis L direction.

Then, by winding the fibers 15 from one end portion (first end portion) toward the other end portion (second end portion) of the body part 11, a first hoop layer 21 is formed on the outer circumference of the body part 11. The one end portion of the body part 11 is, for example, an end portion located on the right side of the drawing surface in FIG. 2, and the other end portion is, for example, an end portion located on the left side of the drawing surface in FIG. 2. Subsequently, the fibers 15 are turned back at the other end portion of the body part 11 and are hoop-wound from the other end portion toward the one end portion of the body part 11, whereby a second hoop layer 21 is laminated on the outer side of the first layer of the hoop layer 21 (that is, on the side farther from the outer circumference of the liner 10). Then, a third hoop layer 21 is laminated on the outer side of the second hoop layer 21, a fourth hoop layer 21 is laminated on the outer side of the third hoop layer 21, . . . and then an N+1th hoop layer 21 is sequentially laminated on the outer side of an Nth hoop layer 21. Hereinafter, one end portion and the other end portion of the body part 11 may collectively be referred to as "the end portions of the body part 11" in some cases. The one end portion and the other end portion of the body part 11 are adjacent to the dome parts 12.

Here, in order to reduce step differences at respective boundaries between the body part 11 and the dome parts 12, it is preferable to laminate a plurality of hoop layers 21 such that the left and right ends of the laminated hoop layers 21 are inwardly shifted and inclined in a stepwise manner toward the central axis L direction. That is, the length of a cross section cut along the central axis L of the N+1th layer 21 is shorter than the length of a cross section cut along the central axis L of the Nth layer hoop layer 21.

Further, in the hoop layer lamination step, in a state in which a temperature of the end portions of the body part 11 adjacent to the dome parts 12 is set lower than a temperature of a remaining portion of the body part 11, the plurality of hoop layers 21 are laminated. The remaining portion is a portion of the body part 11 other than the end portions. Specifically, as shown in FIG. 2, a cold air blower 30 is disposed above the liner 10 at a position corresponding to each of the one end portion and the other end portion of the body part 11 adjacent to the dome parts 12, and a warm air blower 31 is disposed at a position corresponding to the remaining portion of the body part 11.

Each of the cold air blowers 30 has a nozzle for injecting cold air onto the surface of each of the end portions of the body part 11. The warm air blower 31 is provided at a predetermined interval along the central axis L direction of the liner 10 and has a plurality of nozzles for injecting warm air onto the surfaces of the remaining portion of the body part 11. In the hoop layer lamination step, the temperature of the end portions of the body part 11 adjacent to the dome parts 12 is controlled using the cold air blowers 30, and the temperature of the remaining portion of the body part 11 is controlled using the warm air blower 31, to thereby attain temperature differences between the end portions of the body part 11 and the remaining portion of the body part 11.

Here, for the following reason, it is preferable to set the temperature of the end portions of the body part 11 adjacent to the dome parts 12 at 16° C. or less. That is, occurrence of positional displacement of the fibers during the lamination of the hoop layers is greatly influenced by the viscosity of the resin with which the fibers are impregnated and the tackiness of the resin, and in particular, the influence caused by the tackiness of the resin is the greatest. Note that the temperature herein refers to a surface temperature of the tank 1.

Figure 3:
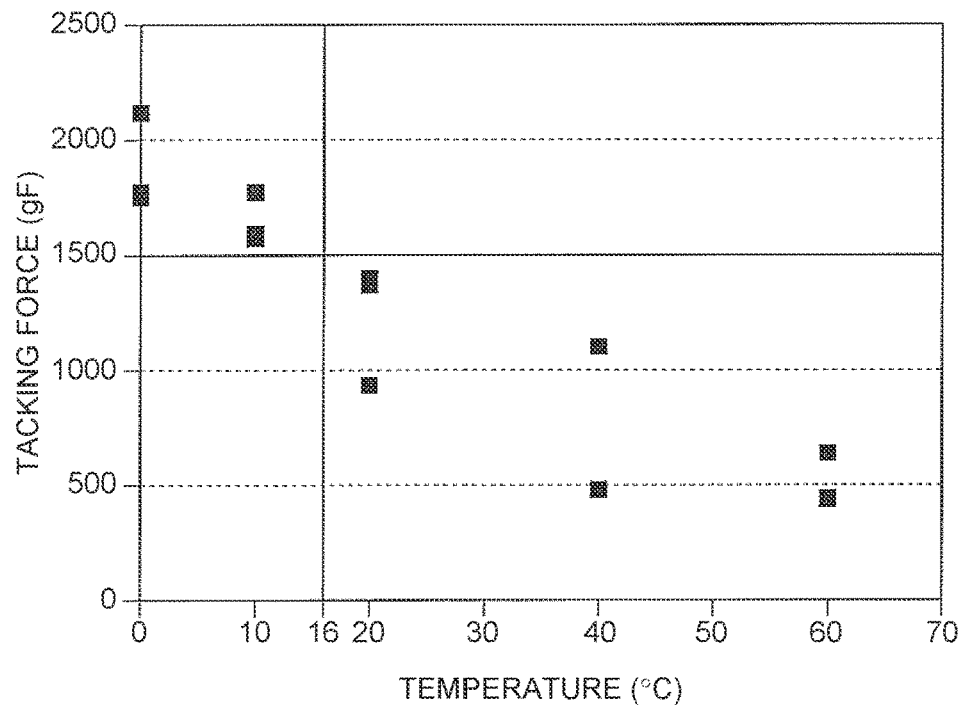
FIG. 3 is a view showing a relationship between a tacking force and a temperature of a resin.
Figure 4:
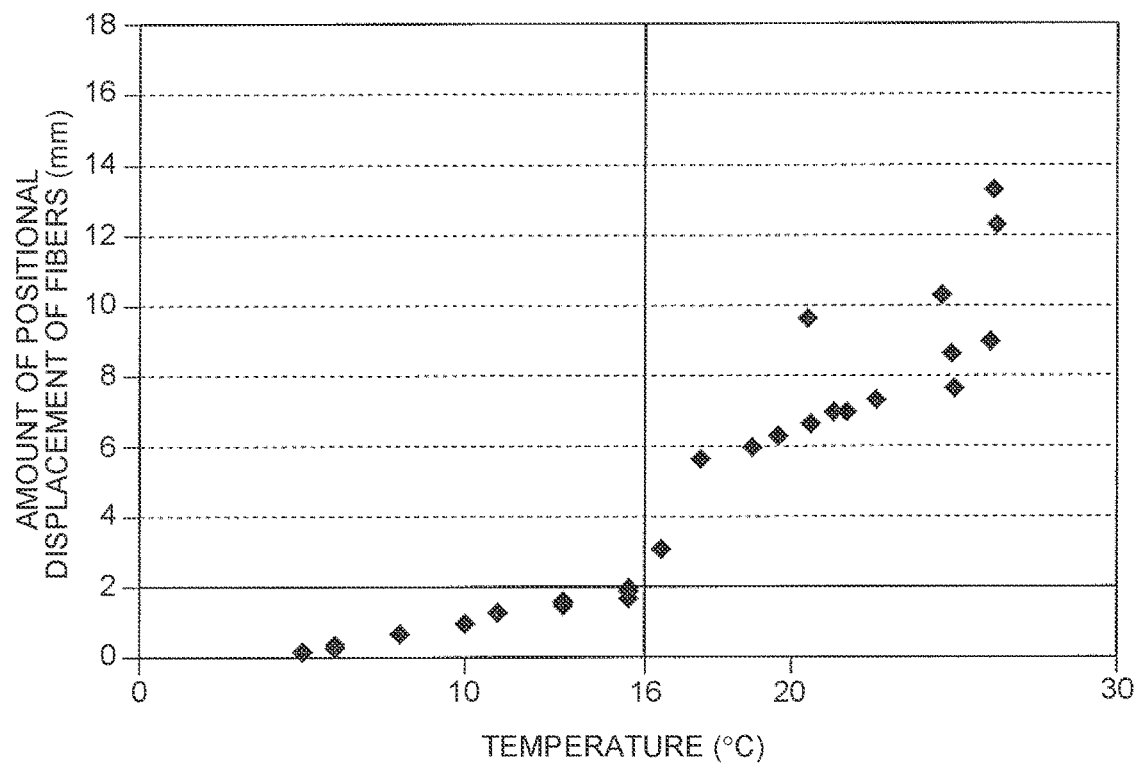
FIG. 4 is a view showing a relationship between amount of positional displacement of fibers and a temperature.

FIG. 3 is a view showing a relationship between a tacking force and a temperature of a resin, and FIG. 4 is a view showing a relationship between amount of a positional displacement of the fibers and a temperature. As shown in FIG. 3, as a normal FW is performed at a room temperature (about 20° C.), the tacking force at this time is 1500 gF or less, and when the temperature becomes 16° C. or less, the tacking force becomes more than 1500 gF. Further, as shown in FIG. 4, when the temperature becomes 16° C. or less, the amount of positional displacement of the fibers becomes 2 mm or less, which is less than the standard width of the fiber width; therefore, it can be deemed that the amount of the positional displacement of the fibers at this degree can be regarded as almost zero. Therefore, by setting the temperature of the end portions of the body part 11 adjacent to the dome parts 12 at 16° C. or less, it is possible to reduce the positional displacement of the fibers at the end portions.

Here, it is more preferable to set the temperature of the end portions of the body part 11 adjacent to the dome parts 12 at 5° C. to 16° C. As described above, by setting the temperature of the end portions of the body part 11 adjacent to the dome parts 12 at 16° C. or less, the positional displacement of the fibers at the end portions can be reduced; therefore, the temperatures at the left and right end portions may be set, for example, at 0° C. or less than zero, but in this case, change or addition of equipment used for setting the temperature at 0° C. or less than zero is required, which raises a problem of increase in cost. In consideration of doing with only existing facilities, it is preferable to set the temperature of the end portions of the body part 11 adjacent to the dome parts 12 at 5° C. or more.

Meanwhile, in the hoop layer lamination step, the temperature of the remaining portion of the body part 11 is set at 20° C. to 25° C. This temperature setting decreases the viscosity of the resin with which the fibers 15 are impregnated, and it is thus possible to increase the permeation property of the resin; therefore, amount of remaining voids in all the hoop layers 21 can be reduced. As a result, it is possible to prevent crack propagation due to the voids, and to improve the pressure capacity of the tank 1.

In the helical layer lamination step following the hoop layer lamination step, the plurality of helical layers 22 are laminated to totally cover the liner 10 in such a manner as to wrap the hoop layers 21 and the dome parts 12 both having been laminated.

In the thermosetting step following the helical layer lamination step, the liner 10 including the hoop layers 21 and the helical layers 22 both having been laminated is placed in a constant temperature oven and heated, for example, at a temperature of about 85° C. so as to thermoset the epoxy resin in the fibers 15. The tank 1 is manufactured in this manner.

In the manufacturing method for the tank 1 according to the present embodiment, in the hoop layer lamination step, the temperature of the end portions of the body part 11 adjacent to the dome parts 12 is set lower than the temperature of the remaining portion of the body part 11, to thereby increase the viscosity of the resin (epoxy resin in the present embodiment) with which the fibers 15 wound around the end portion are impregnated; therefore, it is possible to increase the tackiness (i.e. tacking force) of the resin. With this, it is possible to reduce the positional displacement of the fibers at the end portions of the body part 11 adjacent to the dome parts 12; therefore, the pressure capacity of the tank 1 can be improved, thus making it possible to manufacture the tank 1 of high quality.

Further, in the manufacturing method for the tank of the present embodiment, since the resin is an epoxy resin, by utilizing the excellent adhesiveness of the epoxy resin, it is possible to promote effect to reduce the positional displacement of the fibers at the end portions of the body part 11 adjacent to the dome parts 12. Moreover, in the hoop layer lamination step, since the temperature of the end portions of the body part 11 adjacent to the dome parts 12 is set at 16° C. or less, the amount of positional displacement of the fibers at the both right and left end portions can be reduced to 2 mm or less.

Figure 5:
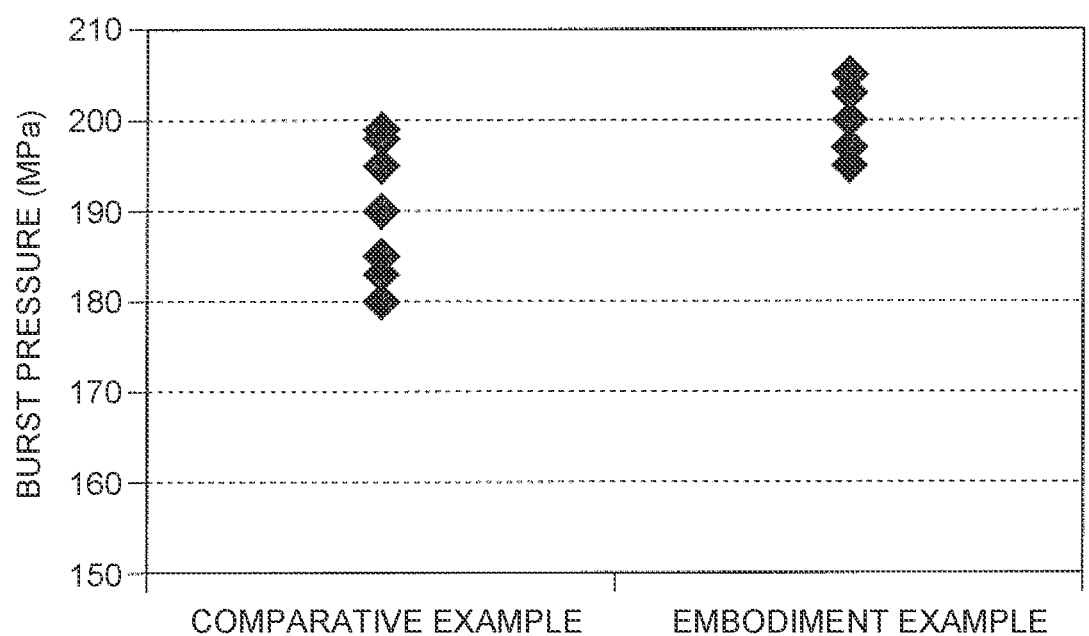
FIG. 5 is a view showing measurement results of a burst pressure of a tank of an embodiment example and of a tank of a comparative example.

Note that the inventor of the present application has experimentally produced tanks of an embodiment example by the manufacturing method for the tank according to the present embodiment, and has compared and evaluated burst pressures with those of tanks of a comparative example. Results thereof are shown in FIG. 5. In FIG. 5, data on the right side is measurement results of burst pressures of tanks of the embodiment example, that is, tanks manufactured in a state in which the temperature (16° C. or less) of the end portions of the body part adjacent to the dome parts was set lower than the temperature of the remaining portion of the body part. On the other hand, data on the left side is measurement results of burst pressures of tanks of the comparative example, that is, tanks manufactured in a state in which the temperature was the same throughout the whole body part. As is conceivable from FIG. 5, when the temperature of the end portions of the body part adjacent to the dome parts is set at 16° C. or less, the amount of positional displacement of the fibers decreases, and the burst pressure (i.e. pressure capacity) increases.

Although the embodiments of the present disclosure have been described above in detail, the present disclosure is not limited to the above-described embodiments, and various design changes can be made without departing from the spirit of the present disclosure described in the claims. For example, in the above-described embodiment, the epoxy resin has been exemplified as a resin with which fibers are impregnated, but a polyester resin, a polyamide resin, or the like may be adopted.

In the above embodiment, the temperature of the end portions of the body part adjacent to the dome parts and the temperature of the remaining portion of the body part were respectively controlled using the cold air blowers and the warm air blower. Alternatively, air conditioners may be adopted instead of the blowers, or the temperature of the end portions may be controlled by using carbon dioxide gas.

What is claimed is:

1. A manufacturing method for a tank, the manufacturing method manufacturing the tank by winding fibers impregnated with a resin in a plurality of layers around an outer circumference of a liner having a body part and dome parts provided at both ends of the body part, the manufacturing method comprising:
    sequentially laminating a plurality of hoop layers by hoop-winding the fibers from a side closer to an outer circumference of the body part toward a side farther from the outer circumference of the body part,
    wherein when laminating the hoop layers, a temperature of end portions of the body part adjacent to the dome parts is set lower than a temperature of a remaining portion of the body part, the remaining portion being a portion of the body part other than the end portions; and
    wherein the temperature of end portions of the body part adjacent to the dome parts is lower than a temperature at which the hoop layers are thermoset.

2. The manufacturing method for the tank according to claim 1, wherein the resin is an epoxy resin.

3. The manufacturing method for the tank according to claim 1, wherein when laminating the hoop layers, the temperature of the end portions of the body part adjacent to the dome parts is set at 16° C. or less.

4. The manufacturing method for the tank according to claim 1, wherein when laminating the hoop layers, the temperature of the end portions of the body part adjacent to the dome parts is set at 16° C. or less and 5° C. or more.

5. The manufacturing method for the tank according to claim 1, wherein when laminating the hoop layers, the temperature of the remaining portion of the body part is set at 20° C. or more and 25° C. or less.

6. The manufacturing method for the tank according to claim 1, wherein:
    when laminating the hoop layers, the fibers are hoop-wound from a first end portion of the end portions of the body part to a second end portion of the end portions of the body part such that an Nth hoop layer, N being an integer of 1 or more, is formed; and
    the fibers are turned back at the second end portion and hoop-wound such that an (N+1)th hoop layer is formed on an outer side of the Nth hoop layer.

* * * * *